(12) United States Patent
Ootera

(10) Patent No.: US 6,671,242 B1
(45) Date of Patent: Dec. 30, 2003

(54) OPTICAL DISK, METHOD OF MANUFACTURING THE SAME AND OPTICAL DISK APPARATUS

(75) Inventor: Yasuaki Ootera, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 428 days.

(21) Appl. No.: 09/783,995

(22) Filed: Feb. 16, 2001

(30) Foreign Application Priority Data

Sep. 20, 2002 (JP) ........................................ 2000-286028

(51) Int. Cl.⁷ .............................................. G11B 15/62
(52) U.S. Cl. ................................ 369/53.19; 369/44.41; 369/44.32
(58) Field of Search .......................... 369/53.19, 44.41, 369/44.32, 44.37, 44.1, 53.14, 53.23, 53.27, 53.28

(56) References Cited

FOREIGN PATENT DOCUMENTS

| JP | 3-162920 | 7/1991 |
|---|---|---|
| JP | 9-174617 | 7/1997 |
| JP | 11-198186 | 7/1999 |

*Primary Examiner*—Nabil Hindi
*Assistant Examiner*—Jorge L Ortiz Criado
(74) *Attorney, Agent, or Firm*—Oblon, Spivak, McClelland, Maier & Neustadt, P.C.

(57) ABSTRACT

A recording apparatus capable of recording an optical disk obtained by adhering two substrates having predetermined curvatures with the convex surfaces of the substrates being adhered, wherein a light source irradiates light through an optical set to the optical disk via a converging lens. Plural light detectors are provided for photoelectrically converting reflection light from the data recording surface of the optical disk and returning through the optical set to output respective signals corresponding to a difference in distance between the lens and the data recording surface, a difference between the center of a light beam spot formed at a focal point position of the lens in a center of either one of a track and a pit line on the data recording surface, and a degree of tilt of the data recording surface. Lens movement mechanisms are provided to move the lens perpendicular and parallel to the data recording surface and to cancel the tilt. The signal recording on the disk is reproduced and output from the apparatus.

2 Claims, 3 Drawing Sheets

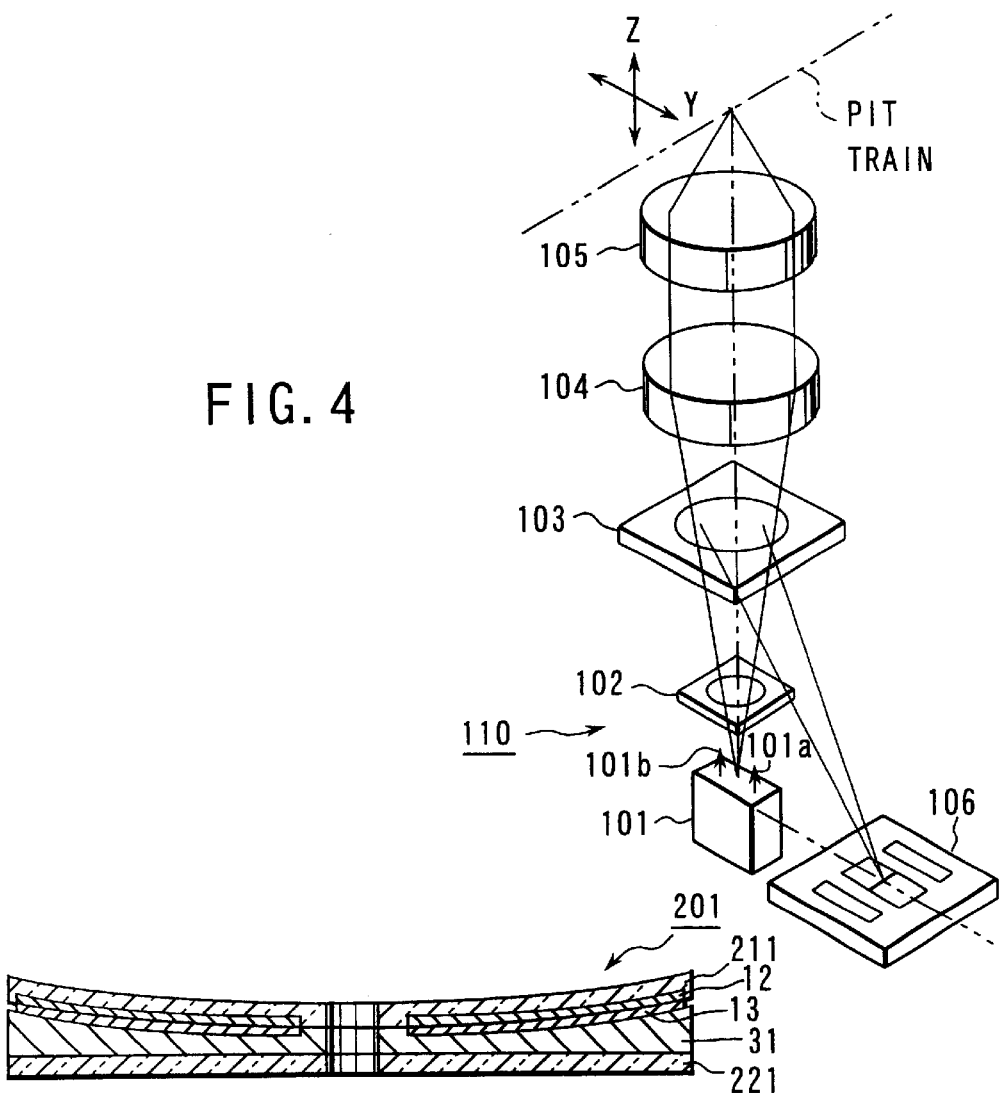
FIG. 4
FIG. 6
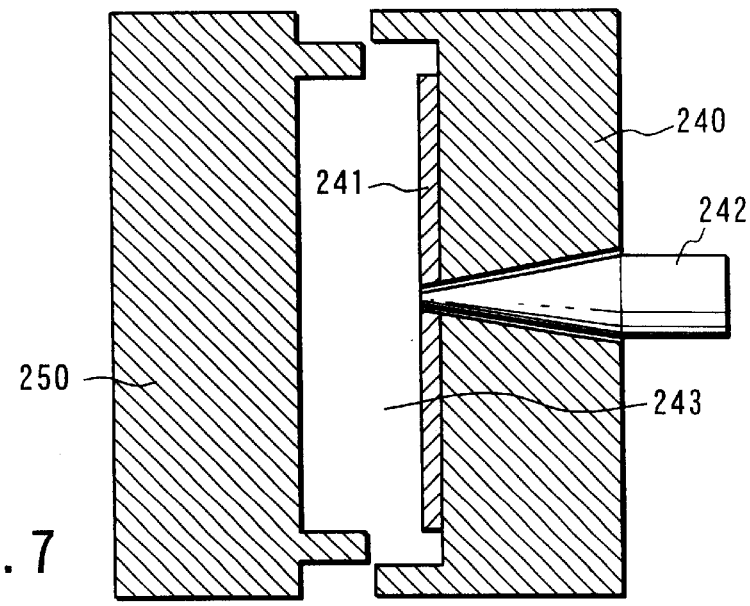
FIG. 7

OPTICAL DISK, METHOD OF MANUFACTURING THE SAME AND OPTICAL DISK APPARATUS

CROSS-REFERENCE TO RELATED APPLICATIONS

This application is based upon and claims the benefit it of priority from the prior Japanese Patent Application No. 2000-286028, filed Sep. 20, 2000, the entire contents of which are incorporated herein by reference.

BACKGROUND OF THE INVENTION

The present invention relates to an optical disk from which an accurate reproduction signal can be obtained when reproduced by a disk drive apparatus by optimally controlling warp created in a disk-shaped recording medium such as an optical disk or a magnetic disk, a method of manufacturing such an optical disk, and an optical disk device which can record data on such an optical disk or reproduce the data from the disk.

A disk drive device which can record data on a disk-shaped recording medium (disk) such as CD-ROM, MO disk or DVD-disk, or can reproduce already recorded data from a disk, is connected to, for example, a personal computer (PC), and thus used so as to supply a system program or software for operating the PC, or for supplying and storing a great amount of data. Alternatively, the disk drive device is connected to, for example, a television or a monitor device, and thus used to reproduce image software or game software.

Since the first music CD was made into practical use, the memory capacities of these disks are increased year by year.

In an optical disk of a DVD-type, a transparent resins such as polycarbonate is used and it is formed by injection molding into a substrate having a surface on which a record pattern is transferred and a flat mirror surface. Then, a reflection film is formed on a data recording surface by, for example, a sputtering method. With this structure, a record pattern is read by making a laser beam incident on the mirror surface.

In this case, in consideration of the productivity, substrates are, in many cases, formed in a cycle of several seconds by injection molding with use of a transparent resin such as polycarbonate.

However, in thin products such as substrates for optic al disks, when the molding in the order of submicrons is performed in a cycle of several seconds by applying such a pressure and heat for transferring a data pattern, it is not inevitable that thus produced substrates have warps due to the remaining stress of the resin.

Nowadays, in order to further increase the density, it will become necessary to increase the pressure applied on a substrate and the temperature of the resin during molding further than those in the current technique as the data patter to be transferred on the substrate becomes finer, and therefore it is expected that the warp of the substrate will become more prominent.

Conventionally, the warp of formed substrates is controlled by adjusting the forming conditions such as the temperature of the metal mold and the pressure for tightening the mold. However, as the data pattern to be transferred on a substrate becomes finer in order to increase the density, the degree of freedom in the forming conditions is lowered. Therefore, it becomes substantially difficult to control the warp by simply adjusting the forming conditions.

As a result, an optical disk which can be obtained by adhering substrates together, is warped, and thus the quality of the reproduction signal is undesirably deteriorated.

In the meantime, when two substrates are adhered together in order to manufacture an optical disk, it is of a general technique that an ultraviolet curing resin is provided between substrates and made into an adhesion layer by a spin coat method. However, in the case where the control of the warp of the formed substrates is not sufficient, and the direction of the radial warp of the substrates is unknown, it becomes difficult to determine the conditions for applying the ultraviolet curing resin when adhering the substrates together. Thus, the uneven distribution of the ultraviolet curing resin applied and run-off of the resin are caused, thereby lowering the yield of the products.

As described above, as the density of the optical disk is increased, the degree of freedom of the forming conditions is lowered. Therefore, it is difficult to control the warp merely by adjusting the forming conditions as in the conventional case. As a result, the warp of the formed substrates, which has becomes even worse, causes an adverse effect on the adhesion of the substrates together and the reproduction of signals.

BRIEF SUMMARY OF THE INVENTION

The present invention has been proposed in consideration of the above-described drawbacks of the conventional technique, and the object thereof is to provide an optical disk having appropriate warp properties for reproducing a signal after application of an ultraviolet curing resin for adhering two substrates and after adhering the substrates together, an optical disks manufacturing method which can produce such optical disks at high yield, and an optical disk apparatus capable of recording data on such an optical disk and reproducing data therefrom.

According to an aspect of the present invention, there is provided an optical disk comprising:
  a data recording surface varying a state when irradiated with light;
  a first substrate for supporting the data recording surface; and
  a second substrate for protecting the data recording surface,
  wherein
    tilt in a radial direction of the first and second substrates as a whole is 0.5° or more and tilt in a tangential direction is 0.10° or less.

According to another aspect of the present invention, there is provided a method of manufacturing an optical disk having a data recording surface, comprising the steps of:
  forming a first substrate having a data recording surface by injection molding, in which a first metal mold having a predetermined surface curvature in a surface on a cavity side is set to face at a predetermined distance to a second metal mold having a surface curvature in a surface on a cavity side, which corresponds to the surface curvature of the first metal mold in an opposite direction, and a material used to form the first substrate is injected between the first and second metal molds while a stamper holding data to be recorded in advance on the data recording surface is provided for one of the first and second metal molds;
  forming a second substrate capable of protecting the data recording surface of the first substrate, by injection molding, in which a first metal mold having a predetermined surface curvature in a surface on a cavity side is set to face at a predetermined distance to a second metal mold having a surface curvature in a surface on a cavity side, which corresponds to the surface curvature of the first metal mold in an opposite direction, and a material used to form the first substrate is injected between the first and second metal molds;

setting a predetermined amount of an ultraviolet curing resin between the substrates; and adhering the two substrates together while irradiating an ultraviolet ray.

According to still another aspect of the present invention, there is provided a method of manufacturing an optical disk having a data recording surface, comprising the steps of:

forming a first substrate having a data recording surface which is convex with a predetermined curvature, by injection molding, in which a first metal mold having a flat surface on a cavity side is set to face at a predetermined distance to a second metal mold having a flat surface on a cavity side, the metal molds are set to have a predetermined difference in temperature between these metal molds while a stamper holding data to be recorded in advance on the data recording surface is provided for one of the first and second metal molds, and a material used to form the first substrate is injected between the first and second metal molds;

forming a second substrate having a surface corresponding to the data recording surface of the first substrate, which is convex with a predetermined curvature, by injection molding, in which a first metal mold having a flat surface on a cavity side is set to face at a predetermined distance to a second metal mold having a flat surface on a cavity side, the metal molds are set to have a predetermined difference in temperature between these metal molds, and a material used to form the second substrate is injected between the first and second metal molds;

directing these substrates to an inner side such that the convex surfaces face each other, and setting a predetermined amount of an ultraviolet curing resin between the substrates; and adhering the two substrates together while irradiating an ultraviolet ray.

According to still another aspect of the present invention, there is provided a recording apparatus capable of recording an optical disk having a data recording surface, obtained by adhering two substrates having predetermined curvatures such that convex surfaces of the substrates are adhered surfaces, the apparatus comprising:

a light source for irradiating light;

an optical set for guiding the light from the light source towards an optical disk;

a lens for converging the light transmitted by the optical set at a predetermined position of the data recording surface of the optical disk, and guiding light reflected by the data recording surface to the optical set;

a first light detector for photoelectrically converting the reflection light from the data recording surface, which is returned through the optical set, and outputting a signal corresponding to a difference in distance between the lens and the data recording surface of the optical disk with respect to a focal distance of the lens;

a second light detector for photoelectrically converting the reflection light from the data recording surface, which is returned through the optical set, and outputting a signal corresponding to a difference between a center of a light beam spot formed at a focal point position of the lens and a center of either one of a track and a pit line on the data recording surface of the optical disk;

a third light detector for photoelectrically converting the reflection light from the data recording surface, which is returned through the optical set, and outputting a signal corresponding to a degree of tile of the data recording surface of the optical disk in a radial direction, which is created as the optical disk is rotated;

a first lens movement mechanism for moving the lens in a direction orthogonal to the data recording surface of the optical disk;

a second lens movement mechanism for moving the lens in a direction parallel to the data recording surface of the optical disk such that the center of either one of the track and bit line coincides with the center of the beam spot; and a radial tilt compensation mechanism for moving the lens in a direction to cancel the tilt in the radial direction detected by the third light detector.

According to still another aspect of the present invention, there is provided a recording apparatus capable of recording an optical disk having a data recording surface, obtained by adhering two substrates having predetermined curvatures such that convex surfaces of the substrates are adhered surfaces, the apparatus comprising:

a light source for irradiating light;

an optical set for guiding the light from the light source towards an optical disk;

a lens for converging the light transmitted by the optical set at a predetermined position of the data recording surface of the optical disk, and guiding light reflected by the data recording surface to the optical set;

a first light detector for photoelectrically converting the reflection light from the data recording surface, which is returned through the optical set, and outputting a signal corresponding to a difference in distance between the lens and the data recording surface of the optical disk with respect to a focal distance of the lens;

a second light detector for photoelectrically converting the reflection light from the data recording surface, which is returned through the optical set, and outputting a signal corresponding to a difference between a center of a light beam spot formed at a focal point position of the lens and a center of either one of a track and a pit line on the data recording surface of the optical disk;

a third light detector for photoelectrically converting the reflection light from the data recording surface, which is returned through the optical set, and outputting a signal corresponding to a degree of tile of the data recording surface of the optical disk in a radial direction, which is created as the optical disk is rotated;

a first lens movement mechanism for moving the lens in a direction orthogonal to the data recording surface of the optical disk;

a second lens movement mechanism for moving the lens in a direction parallel to the data recording surface of the optical disk such that the center of either one of the track and bit line coincides with the center of the beam spot;

a radial tilt compensation mechanism for moving the lens in a direction to cancel the tilt in the radial direction detected by the third light detector; and a signal reproduction mechanism for photoelectrically converting the reflection light from the data recording surface, which is returned through the optical set, and outputting it as a signal recorded on the data recording surface of the optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is an explanatory schematic view showing an optical head device of an optical disk apparatus which can be used for the optical disk according to the embodiment shown in FIGS. 1 to 3;

FIG. 6 is a schematic diagram showing an example of the optical disk manufactured by another embodiment of the present invention; and FIG. 7 is a schematic diagram showing an example of a metal mold for forming substrates used for a conventional optical disk, by injection molding.

DETAILED DESCRIPTION OF THE INVENTION

An embodiment of the present invention will now be described in detail with reference to accompanying drawings. The embodiment described below is merely an appropriate specific example and the scope of the invention will not be limited by this embodiment.

Figure 1:
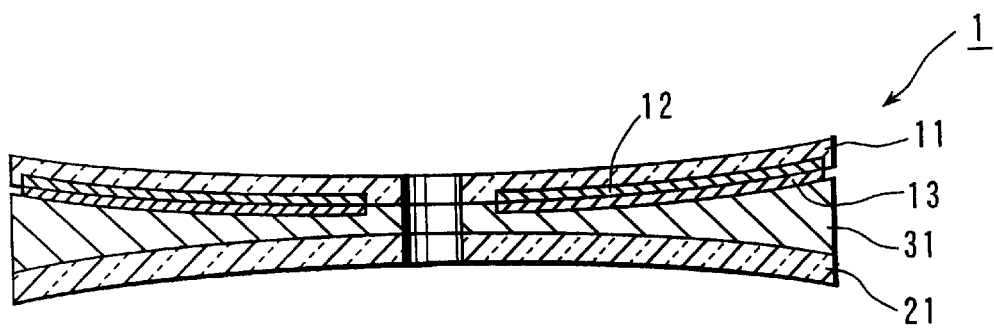
FIG. 1 is a schematic view showing an example of the optical disk manufactured in an embodiment of the present invention.

FIG. 1 is a schematic diagram showing an optical disk manufactured by the use of the embodiment of the present invention.

An optical disk 1 having a structure in which two substrates are adhered together is manufactured by the following manner. That is, a second resin substrate 21 is adhered to one of the surfaces of a first resin formed substrate 11 using an ultraviolet curing resin 31 As an adhesive layer. The first substrate 11 and the second substrate 21 are each formed to have an outer diameter of 120 mm, an inner diameter of 15 mm and a thickness of 0.6 mm. Further, each of the substrates 11 and 21 is made of a transparent resin material (having a high transmittance rate for light having such a wavelength as of a laser beam), for the wavelength of a laser beam emitted from a semiconductor laser element built in an optical disk apparatus which will be later illustrated with reference to FIG. 5.

On the surface of the first substrate 11, with which the ultraviolet curing resin 31 is brought into contact, a data recording region 12 and a reflection film layer 13 are laminated in the order. It should be noted here that the data recording region 12 is shielded from the outer atmosphere as it is covered by the reflection film 13.

Figure 2:
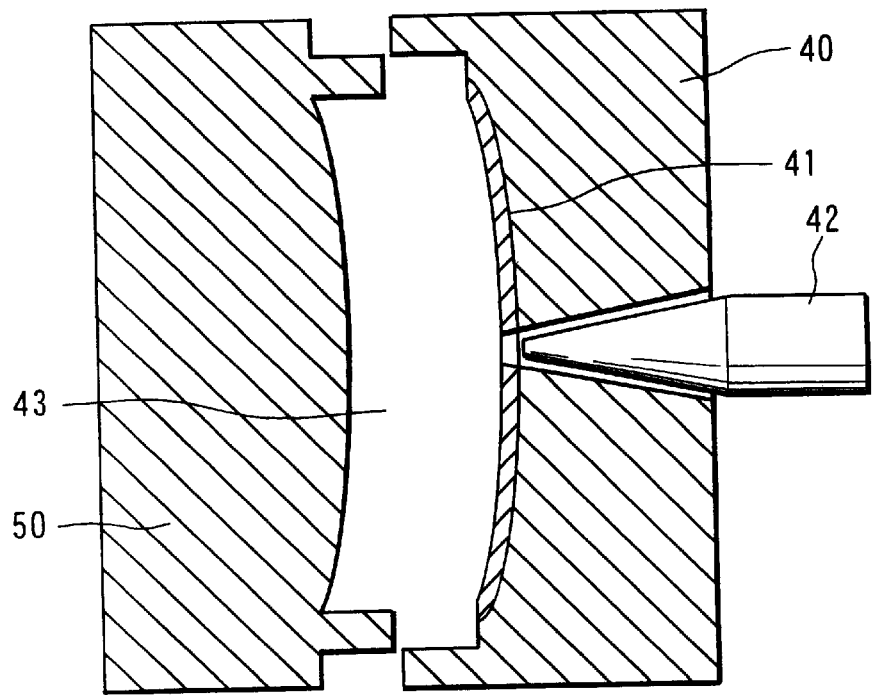
FIG. 2 is a schematic view of an example of metal molds for forming substrates used for the optical disk shown in FIG. 1 by injection.

FIG. 2 is a schematic diagram showing metal molds for injection molding, used to make the first and second substrates 11 and 21 shown in FIG. 1 by the injection molding.

The injection metal molds shown in FIG. 2 is made of a fixed metal mold portion 40 and a movable metal mold portion 50, and a stamper 41 is provided on the surface of the fixed metal mold portion 40, which faces then movable metal mold portion 50. At a predetermined position of the fixed metal mold portion 40, there is provided a nozzle 42 for supplying a melted resin material supplied from a heating portion (material supply portion) which is not shown, towards the movable metal mold portion 50 at a predetermined pressure. It should be noted here that a space 43 defined between the stamper 41 and the movable metal mold portion 50 is called cavity.

The stamper 41 of the fixed metal mold portion 40 and the surface of the movable metal mold portion 50, which is on the cavity 43 side, are each formed on a curved surface having a radius of curvature of 4 m or less and 2 m or more, preferably, a radius curvature of 3 m. It should be noted here that the direction of the curvature surface given to each respective one of the metal mold portions such that they are arranged in opposite directions to each other. In the example shown in FIG. 2, the curvature is set to have warp in such a radial direction that is projecting towards the stamper of the fixed metal mold 40. Further, usually, as the stamper 41, a type having a pattern formed thereon to be transferred to the data recording region 12 is used to form the first substrate 11, whereas a mirror surface type stamper is used to form the second substrate 21. A method for providing a transfer pattern corresponding to the data recording region 12 on the stamper 41, is as follows. First, a photoresist is applied on a glass master disk, and thus a data pattern is recorded by exposing it by a laser beam. A developing process is carried out after the exposure, and thus a glass master disk on which recesses and projections are recorded is obtained. Next, on the glass master disk, a conductive layer is provided by, for example, non-electrolytic plating method such as sputtering, and with use of the conductive layer as an electrode, the stamper is formed by the plating method. It should be noted that the material mainly used for the stamper is Ni.

With use of the fixed metal mold portion 40 and the movable metal mold portion 50 shown in FIG. 2, the substrates 11 and 21 are thus formed. Due to the curvature surfaces provided in the metal mold portions 40 and 50, thus formed products are substrates warped in radial directions, and therefore the most of the remaining stress in the resin when injection molding is released in the radial direction when the substrates are cooled down. Thus, the warp in the tangential direction becomes very small. In the substrates 11 and 21 thus formed, the warp in the radial direction is about 0.5° in the case where it is to project to the stamper side, whereas the warp in the tangential direction is 0.1°.

Figure 3:
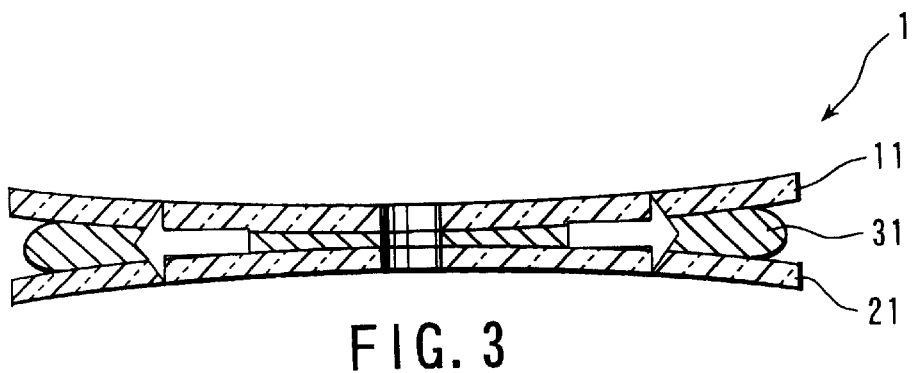
FIG. 3 is a schematic view illustrating a step for adhering substrates formed with use of the metal molds shown in FIG. 2, with an ultraviolet curing resin.

The projecting surfaces of thus formed substrates 11 and 21 are both directed to the side of the ultraviolet curing resin 31 side (the inner surface of the disk) when the optical disk 1 is formed by adhering two substrates together as shown in FIG. 1. During this operation, each of the substrates 11 and 21 has a radial warp which is projecting on the adhesion surface side (that is, projection on the inner diameter side and surface side). Therefore, the ultraviolet curing resin 31 dropped on the inner circumferential portion in order to adhering the substrates together, is sandwiched between both substrates as shown in FIG. 3, and thus naturally expanded towards the outer circumferential direction. In this manner, the ultraviolet curing resin 31 can be applied evenly to have a uniform thickness at any coaxial positions, without creating bubbles. After that, the ultraviolet curing resin is cured by irradiating an ultraviolet ray thereto, and thus the optical disk 1 made of substrates adhered together through the ultraviolet curing resin 31 serving as the adhesive layer, is obtained.

In the optical disk 1 having a structure in which two substrates 11 and 21 are adhered together as above, the surface side of each substrate is convex and warped in a radial direction having a radius of curvature of 3 m, that is, warped at about 0.5° in the radial direction and 0.1° or less in the tangential direction.

As described above, the optical disk 1 thus formed is warped in a radial direction at about 0.5°, which is relatively close to 0.8°, which is the upper limit, whereas the warp in the tangential direction is suppressed to 0.1° or less. The upper limit of the warp in the radial direction is 0.7° in the case where the thickness of the optical disk is 0.6 mm, and it is 0.8° in the case where the thickness of the optical disk is 0.5 mm or less. In the meantime, the upper limit of the warp in the tangential direction is 0.15° in the case where the thickness of the optical disk is 0.6 mm, and it is 0.2° in the case where the thickness of the optical disk is 0.5 mm or less.

Figure 5:
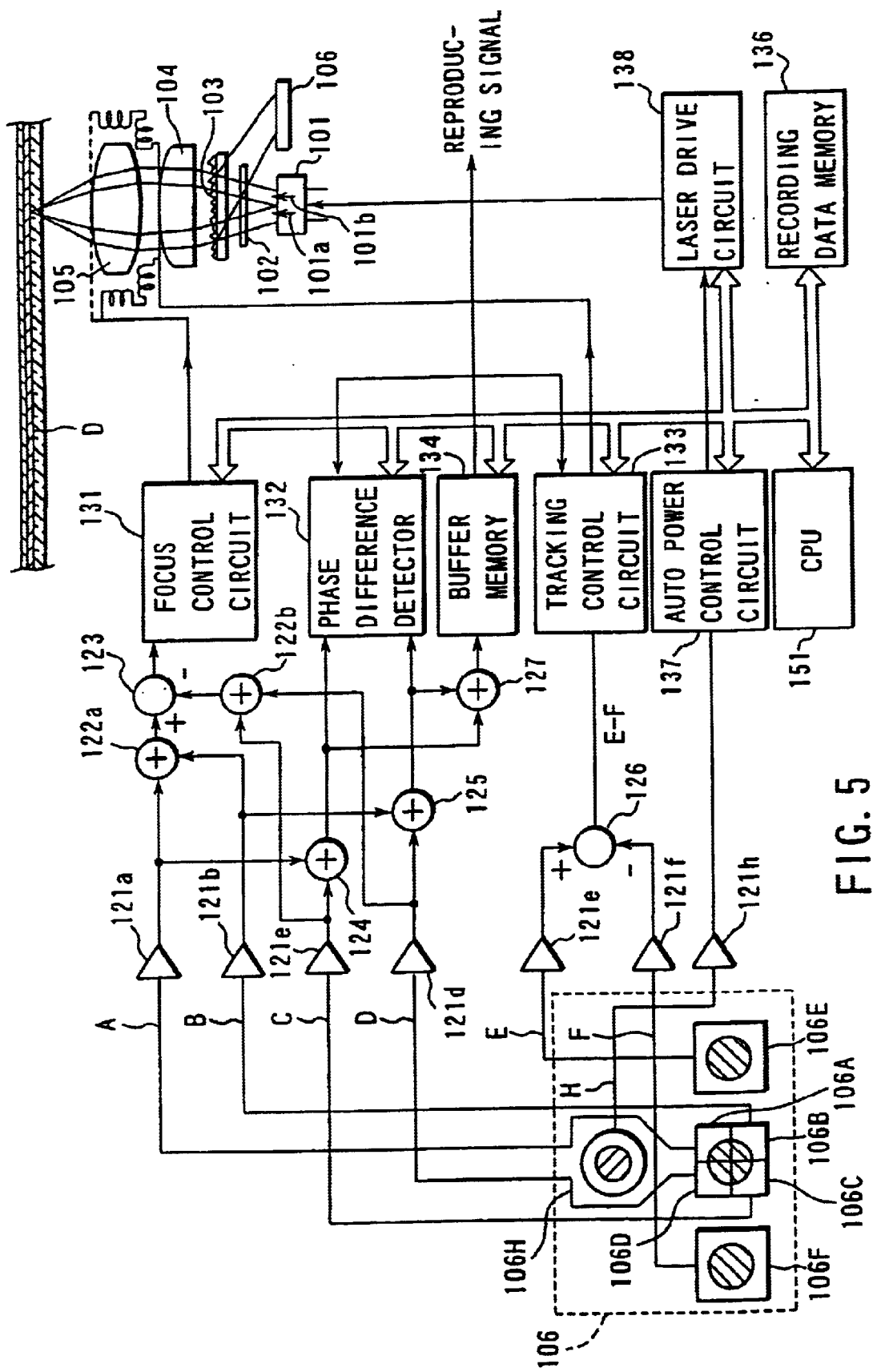
FIG. 5 is a schematic diagram showing an example of a signal processing circuit for processing output signals outputted from photodiodes 106A to 106F and 106H of a light detector 106 of the optical head device shown in FIG. 4.

With the above-described structure, a tangential tilt which might not have been eliminated completely even if a tilt compensation mechanism would be provided on the reproducing apparatus side, can be reduced to a substantially negligible level. Further, regarding the radial tile, it becomes possible to easily obtain optical disks within a range where a practical problem does not occur. It should be noted here that the affect of the radial tilt while reproducing a signal can be easily eliminated by providing a radial tilt compensation mechanism such as a radial tilt servo mechanism or a cross talk canceller, in the reproducing apparatus as shown in FIG. 5. In this manner, excellent reproduction signals can be obtained.

Further, even in the case where the affect of the radial tilt becomes significant due to a further increase in the density of the optical disk or an enhance in NA of the objective lens, it suffices only if a tilt compensation mechanism in a radial direction is provided in the reproducing apparatus. Therefore, it becomes possible to obtain good reproduction signals with an inexpensive device.

FIG. 4 is an explanatory schematic diagram showing an optical head device extracted from an optical disk apparatus which can be used for the optical disk of the embodiment of the present invention shown in FIGS. 1 to 3.

An optical head device 110 shown in FIG. 4 has a semiconductor laser element 101 serving as a light source, in which a first laser chip 101a for outputting a first light beam LA having a wavelength of 780 nm for a CD exclusively for reproduction, and a second laser chip 101b for outputting a second light beam LB having a wavelength of, for example, 650 nm for a DVD-RAM which is recordable under a DVD standard, are integrally contained, a diffraction gratingly 102 for imparting predetermined diffraction properties to the first or second light beam LA or LB outputted from the semiconductor laser element 101, a hologram plate 103 for directly transmitting a light beam which has passed the diffraction grating 102, and imparting a predetermined image-forming pattern to a reflection light beam, which will be later described, a collimate lens 104 for collimating a light beam from the hologram plate 103, an objective lens 105 for converging a light beam collimated by the collimate lens 104, onto a recording surface of the optical disk 1 serving as a recording medium, and a light detector 106 for detecting a light beam guided thereto after being reflected by the recording surface of the optical disk 1 and its optical path being re-directed by the hologram plate 103, and outputting a voltage corresponds to the detected light intensity.

The optical beam having the first or second wavelength, emitted from the semiconductor laser element 101 passes through the diffraction grating 102, in which predetermined diffraction properties are imparted to the beam. Then, the beam is given a predetermined image-forming pattern by the hologram plate 103, and then made incident on the collimator lens 104.

The light beam having passed the collimator lens 104 is converted into a collimated light beam which is a parallel beam, and then guided to the objective lens 105. The optical beam guided to the objective lens 105 is converged by the objective lens 105 to have a beam spot of a predetermined size, and then irradiated on a pit line or a data recording track on the optical disk 1.

The reflection light beam, which has been reflected and changed its light intensity in accordance with the presence or absence of data on a pit line or data recording track on the recording surface of the optical disk 1, is captured by the objective lens 105, and then inputted through the collimate lens 104, where the converging properties are imparted thereto. After that, the light beam is sent back to the hologram plate 103. The reflection light beam returned to the hologram plate 103 is re-directed by the hologram plate 103, and thus the optical path thereof is changed towards the light detector 106.

The light detector 106, as will now be described with reference to FIG. 5, includes 4-division photodiodes 106A, 106B, 106C and 106D for detecting a reflection light beam of a zero-order spot generated by the diffraction grating 102, two photo diodes 106E and 106F for detecting reflection light beams of ±1-order light spot, generated by the diffraction grating 102, to which a positional relationship in a direction orthogonal to the direction in which a track is extended on the optical disk 1 is given to detect reflection light beams by ±1-order light spot, and APC photodiode 106H for monitoring the intensity of the laser beam. It should be noted that the two photodiodes 106E and 106F are situated usually on both sides of the 4-division photodiodes 106A, 106B, 106C and 106D, located at the center. The APC photodiode 106H is situated on the upstream side of the rotating direction of the optical disk 1 with regard to, for example, the 4-division photodiodes 106A, 106B, 106C and 106D.

FIG. 5 is a schematic diagram illustrating a signal processing circuit for processing output signals from the photodiodes 106A to 106F and 106H of the light detector 106 of the optical head device shown in FIG. 4.

The output signals A, B, C, D, E, F, and H, outputted respectively from the photo diodes 106A, 106B, 106C, 106D, 106E, 106F and 106H are amplified by amplifiers 121a, 121b, 121c, 121d, 121e, 121f and 121h to certain levels.

The signals A to F and H outputted respectively from the amplifiers 121a, 121b, 121c, 121d, 121e, 121f and 121h are processed such that the signals A and B are added up by a first adder 122a, and the signals C and D are added up by a second adder 122b. The outputs from these adders 122a and 122b are processed by a third adder 123 where "(C+D) is subtracted from (A+B)", and the resultant signal is supplied to a focus control circuit 131, as an focus error signal for making the position of the objective lens 105 to coincide with the position of a predetermined depth of a track or pit line of the recording surface of the optical disk and the distance where the optical beam converged by the objective lens 105, that is, the focal distance.

On the other hand, an adder 124 forms a signal (A+C), and an adder 125 forms a signal (B+D). These signals (A+C) and (B+D) are inputted to a phase difference detector 132. The phase difference detector 132 is able to output a tracking error signal accurately even in the case where the objective lens 105 is shifted, and therefore it is very useful. Further, a reflection light beam by ±1-order light spot is converted into a signal (E−F) by an adder 126 and supplied to a tracking control circuit 133 as a tracking error signal. That is, the 0-order light spot and the ±1-order light spot, which are generated by the diffraction grating 102, are in a relationship in which they are shifted by ½ track at all times while the 0-order light spot is converged on the recording track. Therefore, even if the objective lens 105 is lens-shifted, the track error can be detected accurately.

Further, the signal (A+C) and the signal (B+D) are further added up by the adder 127 and then converted into a signal (A+B+C+D), that is, a reproduction signal. After that, the signal is stored in the buffer memory 134.

On the other hand, regarding the signal H, the amount of reflection of a light beam emitted from at least one of the first and second laser chips 101a and 101b of the semiconductor laser element 1 towards the optical disk 1, on the recording surface is detected and monitored by the APC circuit 137. In this manner, the intensity of the light beam emitted from one of the laser chips of the semiconductor laser element 1 is controlled to a predetermined level on the basis of the recording data stored in the recording data memory 136.

In the optical head apparatus having the above-described signal detection system, when a CD disk, for example, is set on a turntable (not shown), a drive motor (not shown) is rotated at a predetermined speed, and at the same time, under the control of the laser drive circuit 138, the laser beam LA of a reproduction power is irradiated from the first laser chip 101a of the semiconductor laser element 101 on the recording surface of the optical disk 1.

Here, the optical head apparatus 110 is made to face a calibration area of the innermost circumference of the optical disk set on the turntable. With this structure, the reflection laser beam which is a reflection beam of the irradiated laser beam LA is returned to the light detector 106. The reflection light from the calibration area, which is input to the light detector 106 is converted into a predetermined electric signal by the light detector 106, and then judged by a disk judgment circuit (not shown) if it is a CD disk.

When the type of the disk set there is detected to be a CD, the laser beam LA having a reproduction power is continuously emitted from the first laser chip 101a of the laser element 101 and a signal reproduction operation is started. Here, a detailed description of the operation will be omitted.

When the type of the disk set there is detected to be a DVD-RAM, a laser beam LB' having a reproduction power of about the same level to a lower reproduction power as compared to the laser beam LB of a recording power is emitted from the second laser chip 101b of the laser element 101 under the control of the CPU 151. Thus, in the calibration area, the recording sensitivity of the disk is detected and the recording power is predicted. It should be noted that when the reflection laser beam is detected by the APC photodiode 106H, its output is reflected in the prediction.

Next, on the basis of an output from a phase shift detector 132, the deflection of the surface of the optical disk 1, that is, the displacement in the tangential direction of the rotation of the disk 1, is checked. Thus, the variation amount (the focus offset amount for follow-up) of the objective lens 105 per one rotation of the optical disk 1, which is to be supplied to a focus coil (not shown) from the focus control circuit 131 is set, and the objective lens 105 is focus-locked with respect to the surface deflection of the optical disk 1.

From this on, when it is detected that data to be recorded is supplied to the recording data memory 136 from outside or a buffer memory (not shown) under the control of the CPU 151, the optical head device 1 is moved in the radial direction of the optical disk 1 by a head movement mechanism (not shown) while outputting the laser beam LB', so as to search a recorded region where data has been already recorded.

Next, the optical head device 110 is moved to an arbitrary track on the optical disk 1, and the decentering of the optical disk 1 (the displacement in the radial direction in one rotation of the disk 1) is checked on the basis of an output from a tracking control circuit 133 and an output from the phase shift detector 132. Thus, the variation amount (the track offset amount) of the objective lens 105 per one rotation of the optical disk 1, which is to be supplied to a focus coil (not shown) from the tracking control circuit 133 is set, and the objective lens 105 is locked with respect to the decentering of the optical disk 1. It should be noted that as described before, the 0-order light spot and the ±1-order light spot, which are generated by the diffraction grating 102, are in a relationship in which they are shifted by ½ track at all times while the 0-order light spot is converged on the recording track. Therefore, even if the objective lens 105 is lens-shifted, the track error can be detected accurately.

Thereafter, the recording with the laser beam LB is continued, and the data is recorded in the order along the rotation of the optical disk 1.

FIG. 6 is a schematic diagram illustrating an example of a different optical disk from that shown in FIG. 1. It should be noted here that the same or similar structure as or to those illustrated in FIG. 1 are designated by the same reference numerals, and detailed explanations therefor will be omitted here.

As shown in FIG. 6, an optical disk 201 having a structure in which two substrates are adhered together is manufactured by the following manner. That is, a second resin substrate 221 is adhered to one of the surfaces of a first resin formed substrate 211 using an ultraviolet curing resin 31 as an adhesive layer.

FIG. 7 is a schematic diagram showing a flat plate metal mold for injection molding, used to make the first and second substrates 211 and 221 shown in FIG. 6 by the injection molding. The injection metal mold shown in FIG. 7 is made of a fixed metal mold portion 240 and a movable metal mold portion 250, and a stamper 241 is provided on the surface of the fixed metal mold portion 240, which faces the movable metal mold portion 250. At a predetermined position of the fixed metal mold portion 240, there is provided a nozzle 242. In the case where the metal mold shown in FIG. 7 is used, the stamper 241 is a mirror-surface stamper on which not data is recorded, and therefore it is not necessary to consider the transfer properties. Further, the forming conditions such as the molding temperature and the molding pressure can be set relatively freely, and thus a substrate with no substantial warp can be relatively easily obtained.

The first substrate 211 is made of a data recording region 12 and a reflection film layer 13 which covers the entire area of the data recording region 12, as in the case of the substrate 11 shown in FIG. 11. Further, the second substrate 221 is substantially identical to the substrate 21 shown in FIG. 1 except only if there is warp or not.

A method of manufacturing the optical disk 201 shown in FIG. 6 will now be described.

First, the first substrate 211 and the second substrate 221 are formed in an arbitrary order with use of the fixed metal mold portion 240 and the movable metal mold portion 250 which constitute the flat plate metal mold. It should be noted here that a second substrate 221 with no substantial warp can be obtained by setting the forming conditions such as the molding temperature and molding pressure to predetermined appropriate conditions while actually manufacturing the substrate. Further, for making the first substrate 211, a stamper on which a transfer pattern corresponding to the data recording region 12 is recorded is used as the stamper 241. Here, the temperature of the fixed metal mold portion 240 which becomes a adhering surface, to which the stamper 241 is mounted, is set lower by about 6° C., preferably, about 4° C., as compared to the temperature of the movable metal mold portion 250.

With this structure, the substrate 211 is formed to have a state in which the adhering surface is warped to be convex due to the difference between the resin contraction rate on the side brought into contact with the stamper 241 and situated inner side (adhering surface side) while adhering the two substrates, and the resin contraction rate on the movable metal mold portion 250. When the substrate 211 is cooled down, the contraction in the radial direction where it is convex on the adhering surface side becomes dominant, the warp created in the tangential direction can be suppressed to a very small level, that is, 0.1° or less in terms of angle.

Next, the first substrate 211 and the second substrate 221 are adhered together by means of the ultraviolet curing resin 31 such that the data recording region 12 of the first substrate 211 is situated on an inner side. The first substrate is warped around its inner diameter side in a radial direction to be convex towards the inner surface, and therefore the ultraviolet curing resin 31 dropped on the inner circumferential portion of the substrate 211 for spin-coat for adhering the substrates together, can be applied on an entire surface of the substrate in a uniform and stable manner.

Then, with irradiation of an ultraviolet ray, the ultraviolet curing resin 31 is cured, and thus the optical disk 201 having the two substrates adhered together can be obtained.

In thus formed optical disk 201, the most of the remaining stress of the resin resulting in the molding can be released in the radial direction, and therefore the warp in the tangential direction becomes 0.1° or less. In other words, in the optical disk 201, the direction of the warp is controlled only in the radial direction, and therefore during the reproduction of signals, it becomes unnecessary to consider the affect of the warp in the tangential direction whose tilt cannot be easily compensated. Therefore, even if an inexpensive device equipped only with a tilt compensation mechanism for the radial direction is used as the reproduction apparatus for reproducing the optical disk 201, excellent reproduction signals can be obtained.

With the disk substrates having the above-described structure, the remaining stress of the resin resulting in the formation of the substrates is released only in the radial direction, the warp in the tangential direction can be prevented from becoming even worse, and suppressed to a minimum level. That is, the warp in a tangential direction cannot be easily eliminated by means of the tilt compensation mechanism on the disk drive side, and a substrate with the above-described warp properties, has such a very small warpage in its tangential direction; therefore excellent reproduction signals can be obtained merely by providing a radial tilt compensation mechanism in the reproduction apparatus. In addition, its radial tilt is convex towards the adhering surface side, and the tangential tilt is small, and therefore when an adhesive such as ultraviolet curing resin is applied by a spin coat method for adhering two substrates together, it can be applied easily on an entire surface of the substrate uniformly without bubbles. In this manner, it is possible to stably manufacture optical disks of such a good quality that the level of reproduction signals is stable and undesired noise components are not easily generated.

Further, as a means for manufacturing substrates having the above-described warp properties in a stable and easy manner, a metal mold with a cavity, having warp in the radial direction imparted in advance, is used. Therefore, the remaining stress of the resin in the formed substrate is released only in the radial direction, and therefore the tangential tilt becomes small. In order to prevent the remaining stress of the resin and the radial tilt from becoming excessively inappropriate for adhering substrates and reproducing signals, the radius of curvature of the surface of the metal mold cavity is set to 2 m or more but 4 m or less, and the direction of the surface curvature is set such that the adhering surface is convex. Within such a range of the radius of curvature, it will not drift significantly from the standard value of the warp in the radial direction of 0.8° for substrates of a DVD-type. Therefore, the effect of the radial tilt can be surely removed by the radial tilt compensation mechanism on the disk drive while producing signals. Further, as the adhering surface is set to be convex, it is possible to apply an ultrasonic curing resin used for adhering substrates on an entire surface of a substrate uniformly and stably.

As described above, the metal mold cavity is (made to be) warped in a radial direction in advance. With this structure, the warp of the formed substrate can be controlled advantageously for the adhesion step and signal reproduction. Thus, if the degree of freedom of the forming conditions is limited in accordance with a further increase in the density of the optical disk, the warp of the substrate can be controlled stably merely by controlling forming conditions slightly.

Further, there is a method of manufacturing a substrate, which can suppress the tangential tilt by relaxing in the radial direction the remaining stress of the resin within a formed substrate with certain forming conditions, for manufacturing a substrate having warp properties advantageous for adhesion and signal reproduction. In this method, the temperature of the metal mold portion which becomes a adhering surface, is set lower by about 4° C. or more, as compared to the temperature of the opposite metal mold portion. With this structure, the resin contraction rate on the adhering surface becomes lower, and therefore a substrate whose adhering surface is convex can be obtained. When the substrate is cooled down, the contraction in the radial direction becomes dominant, the warp created in the tangential direction can be suppressed to a very small level. The substrate thus obtained has a radial tilt which is convex to the adhering side and further a small tangential tilt. Therefore, when such substrates are adhered together, the ultraviolet curing resin can be easily applied on an entire surface of the substrate in a uniform and stable manner without creating bubbles by means of a spin-coat method. Therefore, high-quality optical disks can be manufactured stably. Further, tangential tilt, which, in some cases, cannot be completely removed by the tilt compensation mechanism, becomes small, and thus it is advantageous for reproduction of signals.

As described above, according to the present invention, excellent reproduction signals can be obtained merely by providing a radial compensation mechanism on the reproduction device.

Further, in the adhesion step as well, it becomes possible to apply an adhesive uniformly without creating any bubbles.

In this manner, an optical disk substrate having warp properties advantageously for the adhesion step and signal reproduction can be easily obtained. Thus, if the degree of freedom of the forming conditions is limited, the warp of the substrate can be controlled stably.

Therefore, the yield of the optical disk can be improved and the manufacturing cost for the optical disk can be reduced.

Further, it becomes possible to manufacture an optical disk capable of reproducing a signal in a stable manner at high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus capable of recording an optical disk having a data recording surface, obtained by adhering two substrates having predetermined curvatures such that convex surfaces of the substrates are adhered surfaces, said apparatus comprising:

a light source for irradiating light;

an optical set for guiding the light from the light source towards an optical disk;

a lens for converging the light transmitted by the optical set at a predetermined position of the data recording surface of the optical disk, and guiding light reflected by the data recording surface to the optical set;

a first light detector for photoelectrically converting the reflection light from the data recording surface, which is returned through the optical set, and outputting a signal corresponding to a difference in distance between the lens and the data recording surface of the optical disk with respect to a focal distance of the lens;

a second light detector for photoelectrically converting the reflection light from the data recording surface, which is returned through the optical set, and outputting a signal corresponding to a difference between a center of a light beam spot formed at a focal point position of the lens and a center of either one of a track and a pit line on the data recording surface of the optical disk;

a third light detector for photoelectrically converting the reflection light from the data recording surface, which is returned through the optical set, and outputting a signal corresponding to a degree of tilt of the data recording surface of the optical disk in a radial direction, which is created as the optical disk is rotated;

a first lens movement mechanism for moving the lens in a direction orthogonal to the data recording surface of the optical disk;

a second lens movement mechanism for moving the lens in a direction parallel to the data recording surface of the optical disk such that the center of either one of the track and bit line coincides with the center of the beam spot; and a radial tilt compensation mechanism for moving the lens in a direction to cancel the tilt in the radial direction detected by the third light detector.

2. A recording apparatus capable of recording an optical disk having a data recording surface, obtained by adhering two substrates having predetermined curvatures such that convex surfaces of the substrates are adhered surfaces, said apparatus comprising:

a light source for irradiating light;

an optical set for guiding the light from the light source towards an optical disk;

a lens for converging the light transmitted by the optical set at a predetermined position of the data recording surface of the optical disk, and guiding light reflected by the data recording surface to the optical set;

a first light detector for photoelectrically converting the reflection light from the data recording surface, which is returned through the optical set, and outputting a signal corresponding to a difference in distance between the lens and the data recording surface of the optical disk with respect to a focal distance of the lens;

a second light detector for photoelectrically converting the reflection light from the data recording surface, which is returned through the optical set, and outputting a signal corresponding to a difference between a center of a light beam spot formed at a focal point position of the lens and a center of either one of a track and a pit line on the data recording surface of the optical disk;

a third light detector for photoelectrically converting the reflection light from the data recording surface, which is returned through the optical set, and outputting a signal corresponding to a degree of tilt of the data recording surface of the optical disk in a radial direction, which is created as the optical disk is rotated;

a first lens movement mechanism for moving the lens in a direction orthogonal to the data recording surface of the optical disk;

a second lens movement mechanism for moving the lens in a direction parallel to the data recording surface of the optical disk such that the center of either one of the track and bit line coincides with the center of the beam spot;

a radial tilt compensation mechanism for moving the lens in a direction to cancel the tilt in the radial direction detected by the third light detector; and a signal reproduction mechanism for photoelectrically converting the reflection light from the data recording surface, which is returned through the optical set, and outputting it as a signal recorded on the data recording surface of the optical disk.

* * * * *

UNITED STATES PATENT AND TRADEMARK OFFICE
CERTIFICATE OF CORRECTION

PATENT NO.    : 6,671,242 B1                                             Page 1 of 1
DATED         : December 30, 2003
INVENTOR(S)   : Ootera It is certified that error appears in the above-identified patent and that said Letters Patent is hereby corrected as shown below:

Title page,
Item [30], Foreign Application Priority Data, should read:
-- [30]          Foreign Application Priority Data
     Sep. 20, 2000       (JP) ………………………. 2000-286028 --

Signed and Sealed this

Sixteenth Day of March, 2004

JON W. DUDAS
*Acting Director of the United States Patent and Trademark Office*